US012642736B2

(12) United States Patent
Carroll et al.

(10) Patent No.: US 12,642,736 B2
(45) Date of Patent: Jun. 2, 2026

(54) DEVICES, SYSTEMS AND METHODS FOR TREATING AND PREVENTING VENOUS INSUFFICIENCY, THROMBOSIS, ORTHOSTATIC INTOLERANCE, AND IMPAIRED LYMPHATIC DRAINAGE

(71) Applicant: ORBITAL BIODESIGN, LLC, Boulder, CO (US)

(72) Inventors: Danielle J. Carroll, Boulder, CO (US); Jana R. Montgomery, Nederland, CO (US); Levin J. Sliker, Boulder, CO (US); Jacob L. Segil, Boulder, CO (US)

(73) Assignee: ORBITAL BIODESIGN, LLC, Boulder, CO (US)

( * ) Notice: Subject to any disclaimer, the term of this patent is extended or adjusted under 35 U.S.C. 154(b) by 602 days.

(21) Appl. No.: 17/571,230

(22) Filed: Jan. 7, 2022

(65) Prior Publication Data

US 2022/0211576 A1 Jul. 7, 2022

Related U.S. Application Data

(60) Provisional application No. 63/134,664, filed on Jan. 7, 2021.

(51) Int. Cl.

*A61H 11/00* (2006.01)
*A61H 7/00* (2006.01)
*A61H 23/04* (2006.01)

(52) U.S. Cl.

CPC ............ *A61H 11/00* (2013.01); *A61H 7/001* (2013.01); *A61H 23/04* (2013.01);

(Continued)

(58) Field of Classification Search

CPC ........ A61H 11/00; A61H 23/04; A61H 7/001; A61H 2011/005; A61H 2201/1207;

(Continued)

(56) References Cited

U.S. PATENT DOCUMENTS 4,999,861 A * 3/1991 Huang ................ A61G 7/0573 601/51
5,092,315 A * 3/1992 Bennett .................... A61H 1/00 601/93

(Continued)

FOREIGN PATENT DOCUMENTS

CN 111135039 A * 5/2020 ............ A47C 9/002
KR 20160082939 A 7/2016

(Continued)

OTHER PUBLICATIONS

English Machine Translation of CN111135039A translated via US Fit database on Dec. 15, 2024 (Year: 2018).*

(Continued)

*Primary Examiner* — Timothy A Stanis
(74) *Attorney, Agent, or Firm* — Cozen O'Connor

(57) ABSTRACT

An apparatus for treating or preventing venous deficiency, thrombus development, orthostatic intolerance, lymphedema, and/or edema comprising a sleeve wearable on a limb of a user; an upper bracket and a lower bracket releasably couplable to the limb; an actuator coupled to one of the upper or lower brackets; a shaft coupled to the actuator and the other of the upper or lower brackets; a plurality of cams fixedly coupled to, and longitudinally spaced along, the shaft; and a respective plurality of flexible elements each coupled to one of the plurality of cams and to the sleeve. Rotational motion of the actuator about an axis (Continued)

of rotation causes the plurality of cams, via the respective plurality of flexible elements, to induce a peristaltic pressure wave in the limb.

15 Claims, 6 Drawing Sheets

(52) U.S. Cl.
CPC .................. *A61H 2011/005* (2013.01); *A61H 2201/1207* (2013.01); *A61H 2201/1238* (2013.01); *A61H 2201/1418* (2013.01); *A61H 2201/164* (2013.01); *A61H 2201/165* (2013.01); *A61H 2201/501* (2013.01); *A61H 2201/5097* (2013.01); *A61H 2203/0406* (2013.01); *A61H 2205/06* (2013.01); *A61H 2205/10* (2013.01); *A61H 2205/106* (2013.01); *A61H 2209/00* (2013.01)

(58) Field of Classification Search
CPC .... A61H 2201/1238; A61H 2201/1418; A61H 2201/164; A61H 2201/165; A61H 2201/501; A61H 2201/5097; A61H 2203/0406; A61H 2205/06; A61H 2205/10; A61H 2205/106; A61H 2209/00
See application file for complete search history.

(56) References Cited

U.S. PATENT DOCUMENTS 8,388,557 B2 3/2013 Moomiaie-Qajar et al.
10,076,472 B2 * 9/2018 Ramos-Stanbury ... A61K 8/345
10,172,757 B2 * 1/2019 Kazanchyan ........ A61N 1/3603
2009/0118651 A1 5/2009 Rousso et al.
2016/0331620 A1 11/2016 Kazanchyan et al.
2017/0312165 A1 11/2017 Johnson et al.
2018/0271541 A1 9/2018 Figueiredo et al.
2020/0246180 A1 8/2020 Liang et al.
2020/0268592 A1 8/2020 Johnson et al.
2021/0290477 A1 9/2021 Gonon
2023/0346605 A1 11/2023 Carroll et al.

FOREIGN PATENT DOCUMENTS

WO 0202181 A1 1/2002
WO 2006117771 A1 11/2006
WO 2007033401 A1 3/2007
WO 2007079777 A1 7/2007
WO 2008013188 A1 1/2008
WO WO-2014138504 A2 * 9/2014 ............. A47C 9/002
WO WO-2018013188 A1 * 1/2018 ............. A43B 11/00
WO 2019084448 A1 5/2019
WO 2021055158 A1 3/2021
WO 2021196549 A1 10/2021

OTHER PUBLICATIONS

Collins, Steven H., et al., “Reducing the energy cost of human walking using an unpowered exoskeleton”, Research Letter, vol. 522, Jun. 2015, pp. 212-226.
Non Final Office Action for U.S. Appl. No. 18/118,474, mailed Nov. 3, 2025, 32 pages.

* cited by examiner

DEVICES, SYSTEMS AND METHODS FOR TREATING AND PREVENTING VENOUS INSUFFICIENCY, THROMBOSIS, ORTHOSTATIC INTOLERANCE, AND IMPAIRED LYMPHATIC DRAINAGE

CROSS-REFERENCE TO RELATED APPLICATIONS

This application claims the benefit of priority pursuant to 35 U.S.C. § 119(e) of U.S. provisional patent application No. 63/134,664, filed 7 Jan. 2021, entitled "DEVICES, SYSTEMS AND METHODS FOR TREATING AND PREVENTING VENOUS INSUFFICIENCY," which is hereby incorporated by reference herein in its entirety for all purposes.

BACKGROUND

I. Introduction

The venous network in humans is characteristically a low-pressure system, which necessitates the presence of staggered valves in order to prevent backflow as blood from the lower legs is pumped against gravity and back toward the heart. The calf (gastrocnemius) muscle assists with the pumping action during walking, thereby facilitating venous return, but individuals in career fields that involve prolonged standing are at increased risk of a condition known as venous insufficiency, in which the peripheral vascular system becomes overwhelmed by stagnant blood due to inactivation of the calf pump. Here, superficial veins dilate in order to accommodate the venous congestion that results, which can ultimately lead to painful and unsightly varicose veins.

Currently, compression socks and sleeves are available to help combat this issue, but with limited effectiveness. Moreover, the currently available compression socks, sleeves and related apparatuses require frequent replacement due to limited retention of elasticity over time.

What is needed are improved apparatuses, wearables and/or medical devices that effectively prevent, mitigate and/or treat venous insufficiency and related/resultant conditions. Such is provided by the presently disclosed subject matter.

BRIEF SUMMARY

In one embodiment, an apparatus for treating or preventing venous insufficiency, thrombus development, or lymphedema is disclosed. The apparatus includes a sleeve wearable on a limb of a user; an upper bracket and a lower bracket releasably couplable to the limb; an actuator coupled to one of the upper or lower brackets; a shaft coupled to the actuator and the other of the upper or lower brackets; a plurality of cams fixedly coupled to, and longitudinally spaced along, the shaft; and a respective plurality of flexible elements each coupled to one of the plurality of cams and to the sleeve, wherein rotational motion of the actuator about an axis of rotation causes the plurality of cams, via the respective plurality of flexible elements, to induce a peristaltic first pressure wave in the limb.

Optionally, in some embodiments, each of the plurality of cams in angularly indexed with respect to at least one other of the plurality of cams about the axis of rotation.

Optionally, in some embodiments, a first cam of the plurality of cams has a first nose height; and a second cam of the plurality of cams has a second nose height.

Optionally, in some embodiments, the first nose height is greater than the second nose height.

Optionally, in some embodiments, the first cam is adjacent to the second cam along a longitudinal dimension of the shaft.

Optionally, in some embodiments, a direction of rotation of the actuator is reversible.

Optionally, in some embodiments, a rotation of the actuator in a first direction induces the first pressure wave in a cranial/proximal direction in the limb.

Optionally, in some embodiments, a rotation of the actuator in a second direction opposite the first direction induces the first pressure wave in a caudal/distal direction in the limb.

Optionally, in some embodiments, the sleeve is conformable on the limb.

Optionally, in some embodiments, the first pressure wave has a magnitude of between about 30 mmHg and 200 mmHg.

Optionally, in some embodiments, the first pressure wave has a frequency of about 20 to 60 waves per minute.

Optionally, in some embodiments, the apparatus induces a second pressure wave in the limb at the same time and different location as the first pressure wave.

Optionally, in some embodiments, the apparatus includes a power source that powers the actuator.

Optionally, in some embodiments, the user is a human susceptible to and/or is suffering from lower extremity varicose veins, thrombosis, venous insufficiency, blood clot formation, orthostatic intolerance, and/or edema.

In one embodiment, a method of treating or preventing venous insufficiency, thrombus development, or lymphedema is disclosed. The method includes applying a wearable device to a limb of a user, wherein the wearable device includes a sleeve wearable on a limb of a user; an upper bracket and a lower bracket releasably couplable to the limb; an actuator coupled to one of the upper or lower brackets; a shaft coupled to the actuator and the other of the upper or lower brackets; a plurality of cams fixedly coupled to, and longitudinally spaced along, the shaft; and a respective plurality of flexible elements each coupled to one of the plurality of cams and to the sleeve, wherein rotational motion of the actuator about an axis of rotation causes the plurality of cams, via the respective plurality of flexible elements, to induce a peristaltic first pressure wave in the limb.

In one embodiment, a wearable device is disclosed. The wearable device includes: a plurality of flexible elements wearable on a limb of a user. Each of the flexible elements circumferentially surrounds at least a portion of the limb and a plurality of actuators each coupled to a respective one of the plurality of flexible elements. Adjacent actuators are configured to sequentially constrict the limb via the respective plurality of flexible elements to induce a peristaltic first pressure wave in the limb.

Optionally, in some embodiments, the device is adapted for use in an inflight phase of space travel to mitigate hemodynamic changes related to cephalad fluid shifts caused by exposure to microgravity.

DETAILED DESCRIPTION

II. Discussion

Figure 1:
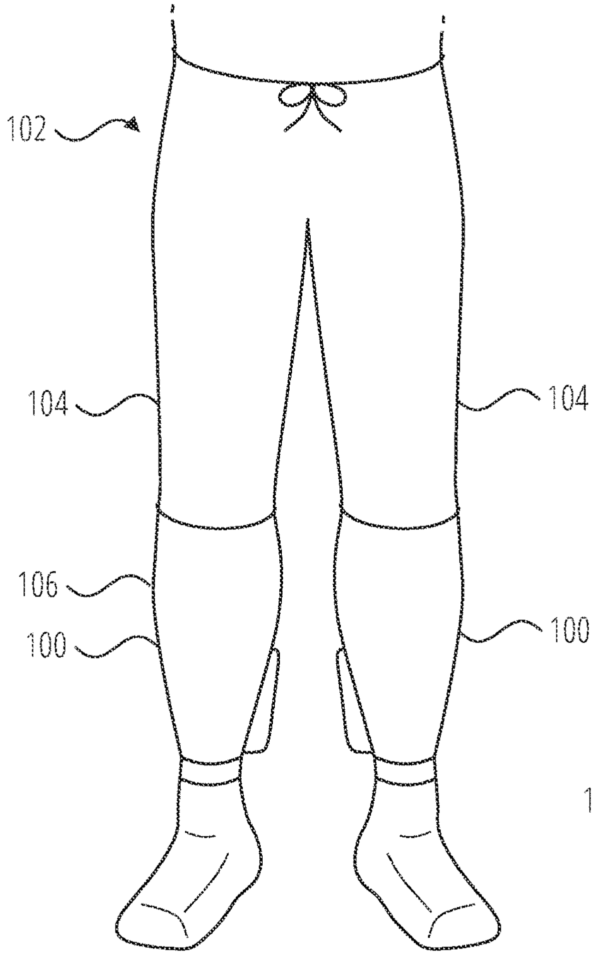
FIG. 1 is a simplified view of wearable devices in place on a user's a lower leg.

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

In humans, as well as other warm-blooded and mammalian species, the venous system functions at a characteristically low pressure. The venous network returns blood from distal structures, to include extremities (e.g. feet/legs and hands/arms), to the cardiopulmonary vasculature, to then reenter the arterial system. Due to the nature of this low-pressure system, the presence of staggered, one-way valves is necessary in order to prevent backflow as blood from extremities and limbs, and particularly the lower legs when in a standing position, is pumped against gravity and back toward the heart. At least in humans, the calf (gastroenemius) muscle in the leg assists with the pumping action during walking and other movements of the legs, thereby facilitating and/or assisting in venous return. However, subjects that are sedentary for extended periods of time, and particularly standing for prolonged periods, e.g., individuals in career fields that involve prolonged standing, are at increased risk of a condition known as venous insufficiency.

Venous insufficiency occurs in subjects when the peripheral vascular system becomes overwhelmed by stagnant blood due to inactivation of the calf pump, i.e., during prolonged standing or other inactivity resulting in reduced blood flow from the extremities. In such instances, superficial veins dilate in order to accommodate the venous congestion that results, which can ultimately lead to painful and unsightly varicose veins.

Definitions

The terminology used herein is for the purpose of describing particular embodiments and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, reaction conditions, and so forth used in the specification and claims are to be understood as being modified in all instances by the term "about".

Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

OVERVIEW OF PRESENTLY DISCLOSED SUBJECT MATTER

In some embodiments, provided herein are apparatuses and/or devices for treating and/or preventing venous insufficiency, wherein the apparatuses and/or devices are configured to be worn by or applied to a subject, wherein the apparatuses and/or devices are configured to apply a peristaltic movement and/or peristaltic pressure to an affected region or area of the subject, wherein the apparatuses and/or devices comprise a soft robotic system capable of producing a peristaltic movement and/or peristaltic pressure within the apparatuses and/or devices. In some embodiments, peristaltic movement can be cranial/proximal for some applications (e.g., terrestrial/venous/lymphatic), and caudal/distal for other applications (e.g., spaceflight use). In some aspects, the soft robotic system capable of producing a peristaltic movement and/or peristaltic pressure within the apparatus and/or device comprises one or more synthetic muscle fibers, optionally wherein the one or more synthetic muscle fibers are configured to be activated concentrically by electrical impulse to mimic natural peristaltic movement.

In some aspects, the apparatuses and/or devices comprise a sleeve or foldable sheet of material, wherein the sleeve or foldable sheet of material comprises the soft robotic system capable of producing a peristaltic movement and/or peristaltic pressure within the apparatuses and/or devices. In some aspects, the sleeve can include an inner layer and an outer layer, wherein the inner layer comprises the soft robotic system, wherein the outer layer comprises a fabric material, wherein the sleeve is configured to be wearable over an appendage or limb of a subject. The soft robotic system of the inner layer can in some aspects comprise synthetic muscle fibers configured to be activated concentrically by electrical impulse to cause a natural peristaltic movement in an axial direction of the sleeve.

In some aspects, the inner layer and outer layer are separable, optionally wherein the inner layer and outer layer are attached and/or integrated. The inner layer can optionally comprise a silicone material, wherein the outer layer can optionally comprise a cotton or neoprene material. The sleeve can comprise any dimension suitable for application to a limb of a subject, optionally wherein the sleeve has a circumference of about 10 cm to about 60 cm (or about 10 cm, 20 cm, 30 cm, 40 cm, 50 cm or 60 cm) optionally wherein the sleeve has a length of about 10 cm to about 60 cm (or about 10 cm, 20 cm, 30 cm, 40 cm, 50 cm or 60 cm), optionally wherein the sleeve has a thickness of about 5 mm to about 1.5 cm (or about 5 mm, 6 mm, 7 mm, 8 mm, 9 mm, 1 cm, 1.1 cm, 1.2 cm, 1.3 cm, 1.4 cm or 1.5 cm). In some embodiments, the apparatus and/or device is configured to be wearable by a subject, optionally wherein the apparatus and/or device is configured to be placed on and/or over a limb, a leg or an arm of a subject, or otherwise applied to an affected area of the subject.

In some embodiments, apparatuses and/or devices are configured to apply a peristaltic movement or peristaltic pressure to an affected region or area of the subject, wherein a force applied to the affected region or area ranges from about 30 mmHg to about 200 mmHg. Additionally, in some aspects, the peristaltic movement or peristaltic pressure is applied at a frequency of about 20 to about 60 contractions per minute.

In some aspects, the apparatuses and/or devices further comprise a power source, optionally wherein the power source is a battery, optionally wherein the battery is rechargeable.

The apparatuses and/or devices can further comprise a computer, optionally wherein one or more functions of the apparatus and/or device are controlled by a processor of the computer, further comprising a computer readable medium having stored thereon computer executable instructions executable by the processor.

Provided herein are methods of treating and/or preventing venous insufficiency, the methods comprising applying the apparatuses and/or devices to a subject in need of treatment, wherein the subject is a human subject, optionally wherein the subject is susceptible to and/or is suffering from lower extremity varicose veins and/or edema. In such methods the apparatuses and/or devices are applied to one or more limbs or extremities of the subject, wherein the apparatuses and/or devices are controlled to apply peristaltic movement and/or peristaltic pressure to an affected region or area of the subject.

Detailed Description of Devices, Apparatuses and Methods to Prevent and/or Treat Venous Insufficiency Provided herein are wearable apparatuses and/or devices configured to be placed on and/or over a limb, e.g. leg, arm, etc., of a subject, or otherwise applied to an affected area of a subject, where the apparatus and/or device is configured to apply a peristaltic movement or peristaltic pressure to an affected region. In some embodiments, such apparatuses and/or devices can comprise a sleeve or foldable sheet of synthetic muscle fibers that can be activated concentrically by electrical impulse to mimic natural peristaltic movement. See, e.g., FIGS. 1, 2A, and 2B.

The disclosed apparatuses and/or devices can comprise synthetic muscle or synthetic muscle fibers, including for example hydraulically amplified electrostatic actuators or other soft robotics that couple electrostatic and hydraulic forces to achieve diverse modes of actuation, to facilitate a natural peristaltic movement or pressure within the apparatus or device. Such synthetic muscle can be arranged within or integrated throughout the apparatus, including for example in a tube or sleeve structure that when activated concentrically via electrical impulse produces or mimics a natural peristaltic movement. In some embodiments, the disclose apparatuses and/or devices can include multiple layers of material/components, such as for example an inner layer (or inner sleeve or sheath) of synthetic muscle fibers surrounded by an outer layer (or outer sleeve or sheath) of material to support and/or maintain the orientation of the inner layer. Alternatively, and/or in addition, in some embodiments the synthetic muscle fibers can be integrated into and/or amongst other fibers or materials to form a composite layer that provides a sheet or sleeve of material with actuatable soft robotic capability to produce a peristaltic pressure. In some aspects, such materials, including the inner sleeve, outer sleeve, composite, etc., can include, but are not limited to cotton, polyester, neoprene, and blends thereof.

Figure 2A:
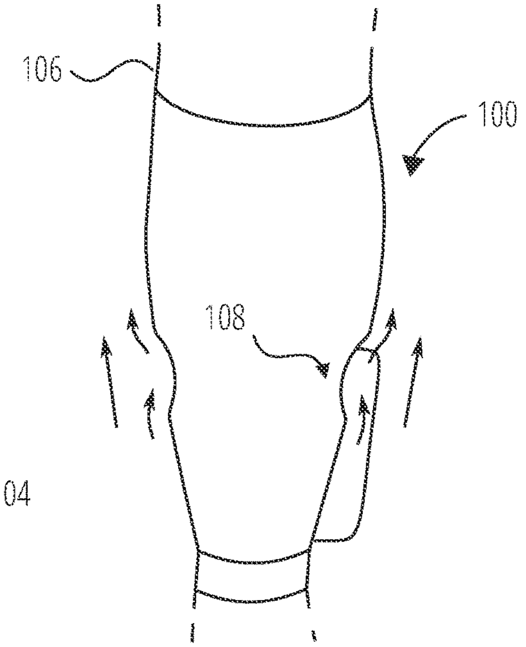
FIG. 2A illustrates an aspect of the subject matter in accordance with one embodiment.

Such an apparatus and/or device, at least in applications for the leg, lower leg and/or calf area of the leg, can help to facilitate venous return by applying sequential external forces that propel blood from the lower leg back to the heart (FIGS. 1 and 2A/B). This alleviates gravity-induced pressure and can both prevent and treat venous insufficiency.

In some embodiments, the disclosed apparatus and/or device can be designed to be wearable by the user such that the user's mobility and/or day-today activities are not significantly affected by the device. In some aspects, the device and/or apparatus can be powered by a small, USB-rechargeable battery, and can be fully Bluetooth-capable and operable through a mobile application. To facilitate ease of use the device can be operable without being plugged into an electrical outlet, although in some aspects it can be configured to be used while plugged into an outlet. Such wearable designs can also be configured to be slim-fit such that they can be worn under clothing and outer wear.

The disclosed apparatuses and/or devices can be configured to apply sufficient pressure to modulate venous and lymphatic flow, while also being comfortable to the user. They can be configured to be easy to apply and remove, e.g., through the use of elastic and stretchable materials, and/or through the use of various fasteners, e.g., hook and loop closures, snaps, buttons, zippers and the like. Such apparatuses and/or devices can be designed to be reasonably quiet, i.e., low decibels, such that use of the device does not disturb the user or others nearby. Moreover, it can be Bluetooth-enabled and can be controlled by a device and/or mobile application.

In some embodiments, and by way of example, the disclosed apparatuses and/or devices can include one or more of the following specifications:

Materials
- Silicone and other proprietary compounds
- Covered in a thin, removable cotton sleeve Dimensions
- Circumference: 40 cm at its widest point
- Length: 32 cm
- Thickness: 2 mm (1.5 cm for small charging pack)

Pumping Action
- Force Applied: 30 mmHg to 200 mmHg (controllable within app)
- Frequency: 20 to 60 contractions per minute (controllable within app)

Charging Mechanism
- USB-rechargeable battery

Additional specifications and examples, including materials, dimensions and the like, are provided herein.

The subject matter disclosed herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application-specific integrated circuits. In addition, a computer readable medium that implements the subject matter described herein can be located on a single device or computing platform or can be distributed across multiple devices or computing platforms.

Figure 2B:
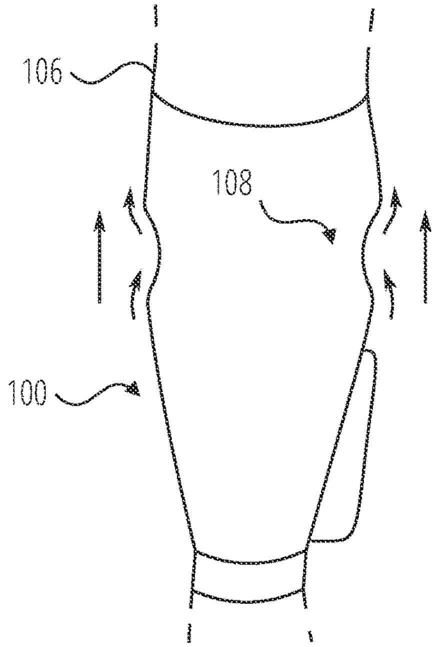
FIG. 2B illustrates an aspect of the subject matter in accordance with one embodiment.

With reference to FIG. 1, an example of a wearable device 100 is shown worn by a user 102. A wearable device 100 is shown on each of the user's calves 106. While the wearable device 100 shown for example may be adapted to be worn on the calves 106, other embodiments, of wearable device 100 may be adapted to be worn on other extremities 104, such as a thigh, or upper or lower arm. The dimensions (e.g., circumference, length, thickness) of the wearable device may be adapted for use different limbs and/or different parts of limbs. In one example, a wearable device adapted for use on an upper arm may have a length of about 20 cm and/or circumference of about 25 cm to 30 cm. In another example, a wearable device adapted for use on a lower arm may have a length of about 20 cm to 25 cm and a circumference of about 15 cm to 30 cm. In another example, a wearable device adapted for use on a thigh of a user may have a length of about 30 cm and a circumference of about 40 cm to 60 cm. In another example, a length of a device adapted to be used for an upper and lower arm may have a length of about 40 cm to 60 cm. In another example, a length of a device adapted to be used for an upper and lower arm may have a length of about 60 cm to 80 cm. A number and spacing of flexible elements may be similarly adapted for use with different limbs or portions of limbs. With reference to FIGS. 2A and 2B an example of a peristaltic pressure wave 108 induced by a wearable device 100 is shown. In the example shown, the pressure wave 108 is a cranial/proximal pressure wave 108 (e.g., a wave that tends to move fluid toward the heart of the user 102). As shown for example, the pressure wave 108 begins low on the user's calf 106, constricting a portion of the calf 106. The pressure wave 108 travels up the calf 106 as the wearable device 100 progressively constricts the calf 106 further up toward the user's heart, while releasing the lower portions of the calf 106. The pressure wave 108 may reset once it reaches an end (e.g., top or bottom) of the wearable device 100. For example, when the 108 reaches the top of the pressure wave 108, a new pressure wave 108 may be initiated by the wearable device 100 at the lower end of the calf 106. In some embodiments, multiple pressure waves 108 may travel along the wearable device 100 at the same time. A wearable device 100 may be configured to apply either a cranial/proximal pressure wave 108 or a caudal/distal pressure wave 108, depending on the user's preference or therapeutic needs. In some embodiments, the direction of a pressure wave 108 can be changed between cranial/proximal and caudal/distal by changing a setting or configuration of the wearable device 100.

With reference to FIG. 3A-FIG. 3D, an example of a wearable device 300 is shown. The wearable device 300 includes an upper cuff 314 and a lower cuff 316. The upper cuff 314 and the lower cuff 316 are adapted to releasably attach the wearable device 300 to a limb of a user 102, such as to the calf 106. The wearable device 300 includes a sleeve 322 that at least partially surrounds the limb of the user 102 between the upper cuff 314 and lower cuff 316. An upper bracket 312 and lower bracket 318 are attached to the respective upper cuff 314 and lower cuff 316. The upper bracket 312 is further coupled to an actuator 310. The lower bracket 318 is coupled to a shaft 306 that extends between an output of the actuator 310 and the lower bracket 318. The shaft 306 may be coupled to the output 328 of the actuator 310. One or more cams 304 are coupled to the shaft 306. Each of the cams 304 has a groove that receives a flexible element 302. The flexible element 302 extends around the calf 106, and its respective cam 304. The flexible elements 302 may be received in or coupled to the sleeve 322. In some embodiments, the 300 may include an actuator, shaft, and plurality of cams on opposite sides of the same limb, as shown for example in phantom lines in FIG. 3A [drafter is updating to show].

Figure 3A:
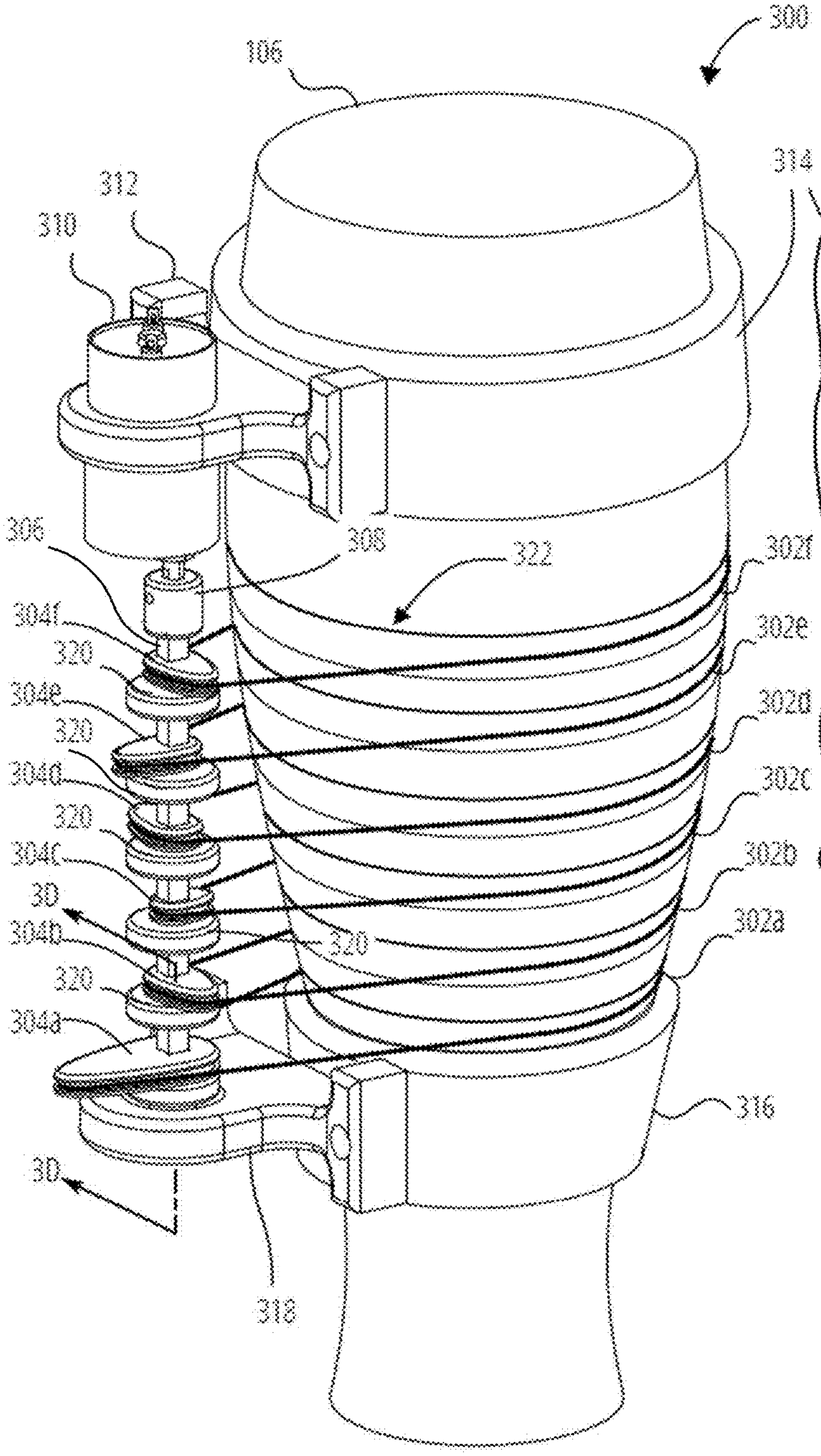
FIG. 3A is an isometric view of an embodiment of a wearable device.
Figure 3B:
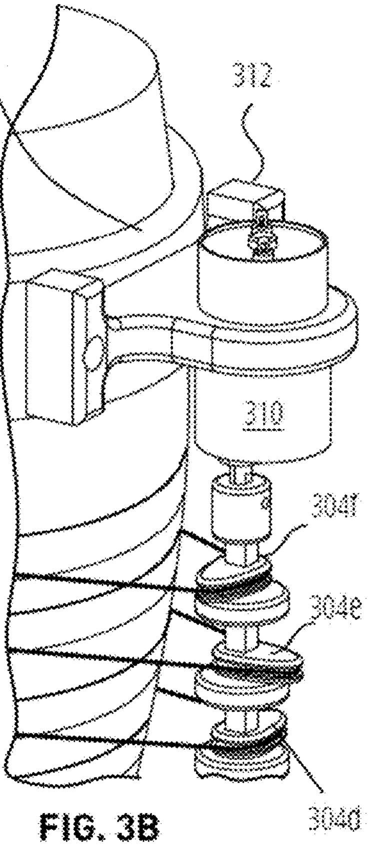
FIG. 3B is an isometric view of the embodiment of the wearable device in FIG. 3A worn on an opposing portion of a limb of a user from the wearable device shown in FIG. 3A.

As previously discussed, the wearable device 300 may include a portable power supply such as a battery to power the actuator 310. In some embodiments, the wearable device 300 may be powered by a corded power supply. As shown for example in FIG. 3B, more than one wearable device 300 may be worn on different parts of the user's limb. For example, as shown in FIGS. 3A and 3B, one wearable device 300 may be worn on one side of a user's limb and another wearable device 300 may be worn on an opposing side of a user's limb. The use of more than one wearable device 300 may be suitable to achieve additional compression of the user's limb compared to the use of one device.

The upper cuff 314 and the lower cuff 316 may be releasably couplable to the limb of a user 102. For example, the upper cuff 314 and/or lower cuff 316 may include hook and loop fasteners, elastic, buckles, clasps, or other fasteners suitable to releasably couple the wearable device 300 to the limb of a user 102. In many embodiments, the upper cuff 314 and the lower cuff 316 may include a soft fabric layer or cover such that the wearable device 300 may be comfortably worn by the user.

The sleeve 322 may be formed of a thin woven or non-woven fabric material or membrane. The sleeve 322 may in many embodiments, have an elastic property such that the sleeve 322 conforms to the shape of the user's limb and may automatically adapt to many different user's with limbs of varying lengths and circumferences automatically. The sleeve 322 may include hems or other passages through which the flexible elements 302 may be received.

The upper bracket 312 and lower bracket 318 are adapted to receive the actuator 310 and the shaft 306. Although the actuator 310 is shown coupled to the upper bracket 312 and the lower end of the shaft 306 coupled to the lower bracket 318, the arrangement may be swapped in other embodiments. The upper bracket 312 and lower bracket 318 offset the shaft 306 and the cams 304 from the limb of the user 102 such that the cams 304 can be rotated around the rotational axis of the shaft 306 by the actuator 310 without interfering with the user's limb. The upper bracket 312 may have an aperture 334 formed therein and adapted to receive (such as fixedly receive) a portion of the actuator 310. Similarly, the lower bracket 318 may have an aperture 336 formed therein and adapted to rotationally support the shaft 306 (e.g., via a bearing, bushing, or the like) with respect thereto. For example, the cap 330 may include a bearing formed therewith that enables relative rotation between the lower bracket 318 and the shaft 306.

The actuator 310 is a rotary actuator suitable to rotate the shaft 306 relative to the upper bracket 312 and the lower bracket 318. In many embodiments, the actuator 310 includes a motor 324 and a transmission 326 (such as a gear reducer) that adapts torque and/or speed of the raw output of the motor 324 to values suitable to rotate the shaft 306 and cams 304 with respect to the limb of the user 102. The transmission 326 includes an output 328 that couples to the shaft 306 via a coupler 308. In some embodiments, the actuator 310 is a pneumatic or hydraulic actuator.

The shaft 306 includes a long, thin body with a cross section adapted to be received in an aperture 332 formed in each of the cams 304 and/or spacers 320. The cross section of the shaft 306 and that of the apertures 332 are such that the cams 304 and spacers 320 do not rotate with respect to the shaft 306. Rather the shaft 306 drives rotation of the cams 304 and spacers 320. In the embodiment shown in FIG. 3A-3D, the shaft 306 has a square cross section. The apertures 332 are similarly square. In other embodiments, the shaft may have other cross-sections, such as round, oval, triangular, hexagonal, or may have flats or other features formed thereon and suitable to fixedly couple the cams 304 and/or spacers 320 to the shaft 306. The cams 304, shaft 306, output 328, and the spacers 320 have a common axis of rotation 344. The cams 304 include a nose 338 and a heel 340, as shown for example with respect to the cam 304*a*. Each of the cams cam 304 may be fixed in place longitudinally along the length of the shaft 306 by an adjacent spacer 320 affixed to the shaft. In some embodiments, the spacers 320 may be optional.

Figure 3C:
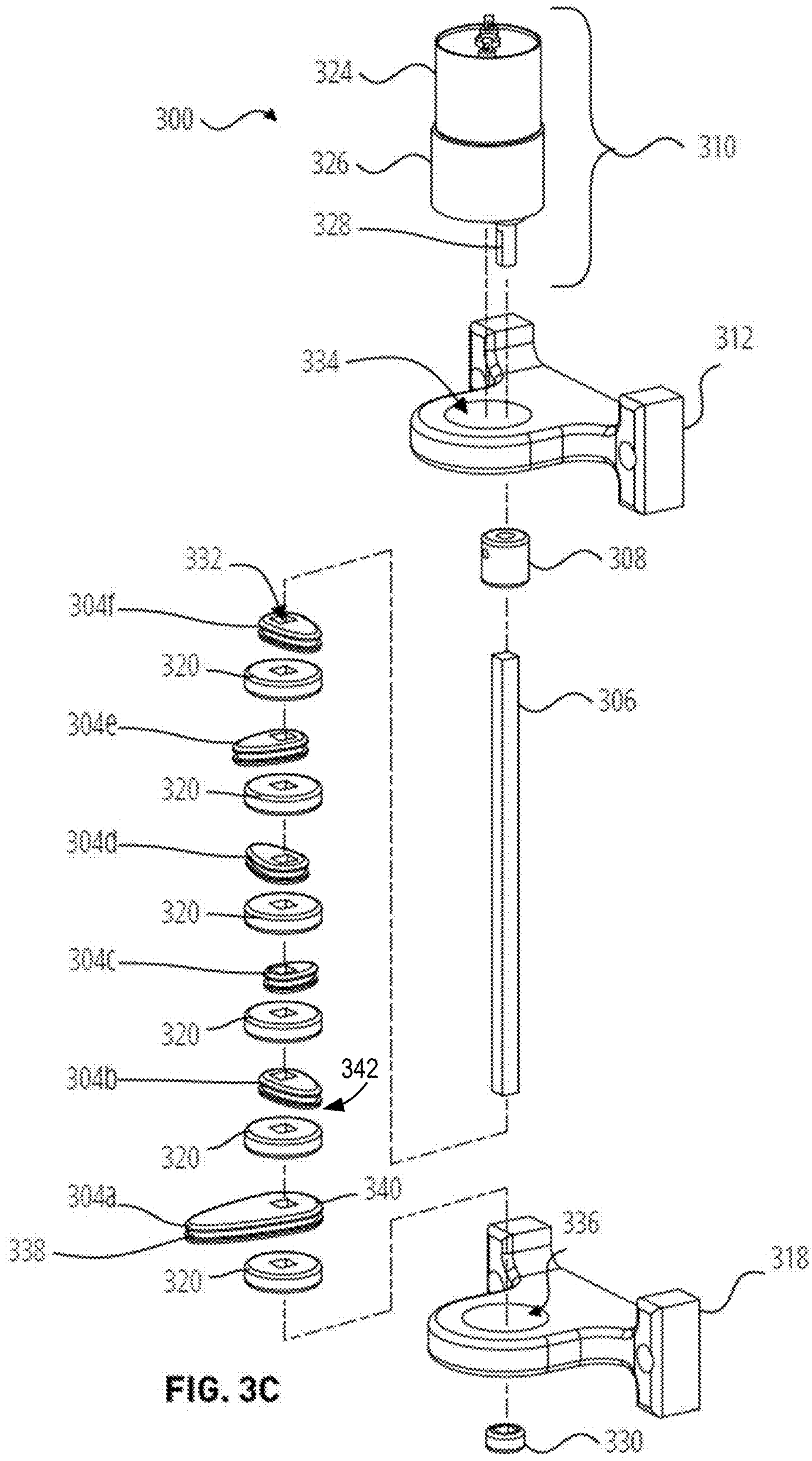
FIG. 3C is an exploded view of the wearable device of FIG. 3A.

As shown for example in FIGS. 3A and 3B, and 3C the cams 304 may be angularly indexed about the shaft 306 with respect to one another. For example, the nose 338 of the cam 304*a* may be oriented in 6 o'clock position when viewed from above. With the shaft 306 in the same position, the cam 304*b* may be disposed in a 3 o'clock position. The cam 304*c* may be disposed in a 12 o'clock position. The cam 304*d* may be disposed in a 9 o'clock position. The cam 304*e* may be disposed in a 6 o'clock position. The cam 304*f* may be disposed in a 3 o'clock position. In other examples, the cams 304 may be disposed at a number of angles with respect to one another in increments of one degree or less or up to 180 degrees. In some embodiments, the respective angles of the cams 304 with respect to one another may be automatically varied while in use such as by a variable cam device, swashplate or the like.

Figure 3D:
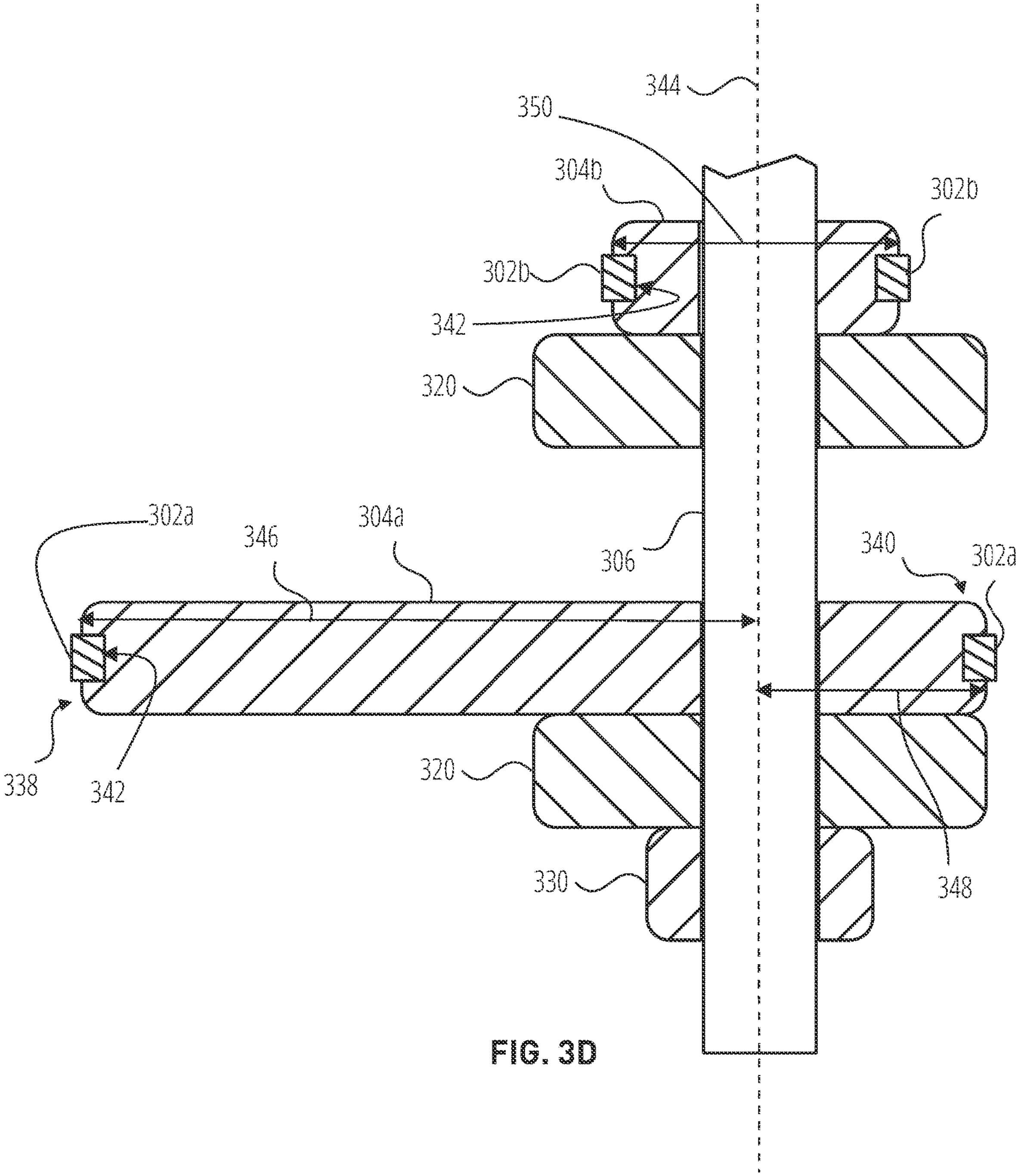
FIG. 3D is a detailed section view of the wearable device of FIG. 3A taken at line 3D-3D.

With particular reference to FIG. 3D, certain details of the wearable device 300 are discussed. As shown for example in FIG. 3D with respect to the cam 304*a*, the nose 338 is disposed a nose height 346 away from an axis of rotation 344 of the shaft 306 and cam 304*a*. Similarly, the heel 340 is disposed a heel height 348 away from the axis of rotation 344. Typically, the nose height 346 is greater than the heel height 348. As shown for example with respect to the cam 304*b*, the cams 304 may have a base width 350 evenly distributed about the axis of rotation 344. The flexible elements 302 are disposed in grooves 342 formed in each of the cams 304. As each cam rotates about the axis of rotation 344 the flexible elements 302 apply pressure to the limb of the user 102 by compressing the portion of the limb adjacent to the flexible element 302 with respect to the wearable device 300. The flexible elements flexible element 302 may have an elastic property (e.g., may stretch along the longitudinal axis thereof) or may be relatively inelastic. An elastic flexible element 302 may apply less force to the limb than an inelastic flexible element. In some examples, a flexible element 302 may be a cord, string, cable, chain, rubber band, bungee cord, or the like.

The nose height 346, heel height 348, base width 350, spacing and/or number of cams 304 along the shaft may be varied as desired. For example, the cam 304*a* may have a larger nose height 346 than the other cams. The cams 304*b*, cam 304*d*, cam 304*e*, and cam 304*f* may have similar nose heights 346 and heel heights 348 as one another. The cam 304*c* may have smaller nose height 346 and heel height 348 than the other cams 304. Different nose heights 346 and heel heights 348 may be used to apply relatively more or less pressure to the limb. For example, the cam 304*a* with its relatively large nose height 346 may apply more pressure to the limb than the other cams with smaller nose heights 346. It may be beneficial to apply varying pressure to the limb at different points due to the tenderness of the tissue at a particular point, the size of the limb at a particular point, or the need to apply greater pressure to achieve the desired peristaltic effect.

By varying the nose height 346, heel height 348, base width 350, spacing and/or number of cams 304 along the shaft, any number and type of pressure waves 108 may be realized. As the shaft 306 is rotated by the actuator 310, each cam in turn reaches a point during a revolution where its nose 338 is at a furthest point from the user's limb during a revolution of the cam (bottom dead center) where the flexible element 302 is pulled against the limb by the nose 338 applying pressure to the limb, as shown for example with the cam 304*a* in FIG. 3A. Similarly, each cam reaches a point during a revolution where its nose 338 is closest to the limb of the user 102 (top dead center) where the tension in the flexible element 302 is relatively less than at bottom dead center, thereby releasing the pressure on the limb. The angular indexing of the cams with respect to one another causes the peristaltic pressure wave 108 to move up or down the limb. The speed of the pressure wave 108 may be varied by varying the speed of the motor 324. The direction of the pressure wave 108 may be reversed by reversing the direction of rotation of the motor 324.

For example, the wearable device 300 generates a cranial/proximal pressure wave 108 when the motor 324 is rotated clockwise when viewed from above. In fact, the wearable device 300 generates two simultaneous pressure waves 108 when configured as shown with point of highest pressure of one pressure wave 108 being applied by the cam 304*a* and the point of highest pressure of the second wave being applied by the cam 304*e*. Beginning as shown in FIG. 3A, the cam 304*a* and the cam 304*e* are at bottom dead center, applying the most pressure to the limb. As the shaft 306 is rotated clockwise when viewed from above, cam 304*b*, cam 304*c*, and cam 304*d* each pass through their respective bottom dead center positions and apply pressure to the limb vie the respective flexible element 302*b*, flexible element 302*c*, and flexible element 302*d*. Thus, the wearable device 300 applies one or more cranial/proximal pressure waves 108 to the limb. To apply a caudal/distal pressure wave 108, the direction of rotation of the motor 324 may be reversed (e.g., counterclockwise when viewed from above).

Thus, the wearable device 300 may be easily adapted to a wide variety of body types, limbs (e.g., upper arm, lower arm, calf, foot, or thigh) and may be adapted to provide either cranial/proximal or caudal/distal peristaltic pressure waves 108. The wearable device 300 may include features, elements, and/or benefits of any other wearable device disclosed herein.

In some embodiments, the wearable device 300 may include a drum with a continuous surface in place of the plurality of cams. The drum may be profiled to generate a continuously variable pressure wave 108 along the limb.

Figure 4B:
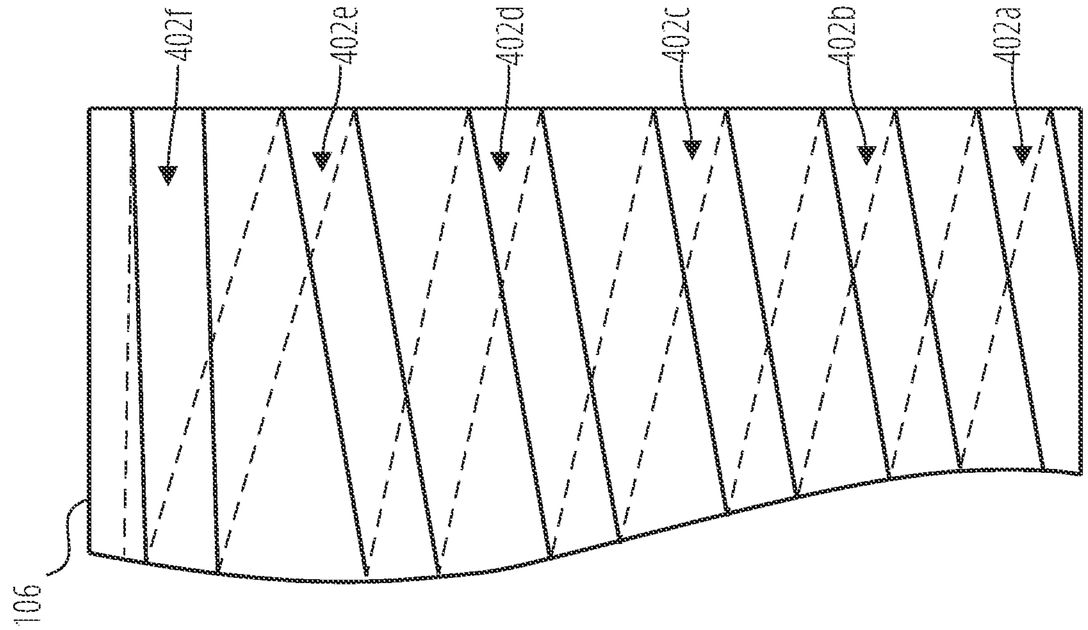
FIG. 4B is a right elevation view of an embodiment of the wearable device of FIG. 4A.
Figure 4A:
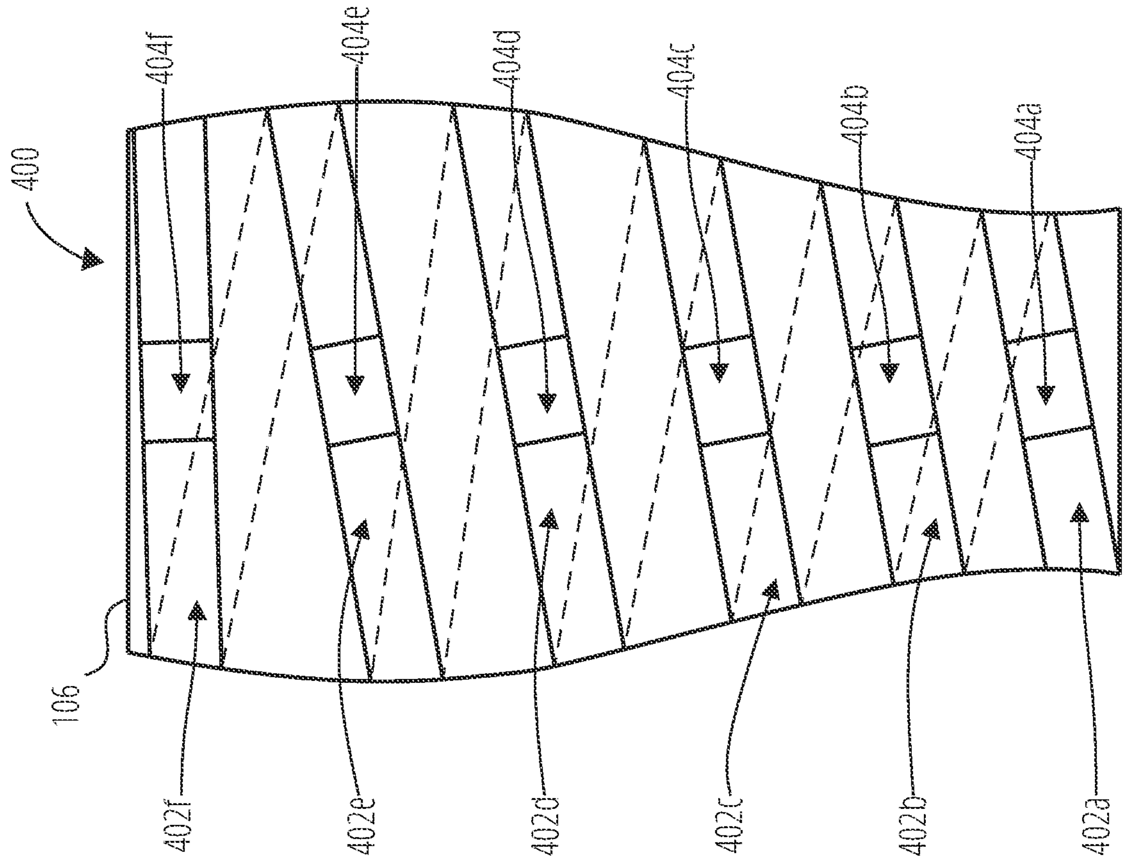
FIG. 4A is a rear elevation view of an embodiment of a wearable device.

With respect to FIGS. 4A and 4B, a wearable device 400 is shown. The wearable device 400 may have any or all of the benefits of other wearable devices disclosed herein. The wearable device 400 uses one or more artificial tendons 402 the wrap around the limb of the user 102. The artificial tendons 402 are coupled to respective actuators 404 that can selectively tighten the tendon around the limb. In some embodiments, the actuator 404 is a clutch mechanism described for example in Collins et al. "Reducing the energy cost of human walking using an unpowered exoskeleton," Nature Research Letter (2015) which is incorporated herein by reference. Similarly, to the wearable device 300, the wearable device 400 can successively activate each actuator 404*a*—actuator 404*f* to generate one or more peristaltic pressure waves 108 that travel up or down the limb of the user. The artificial tendons 402 and/or actuators 404 may be received in or coupled to a sleeve that can be easily donned and doffed by the user 102.

In some embodiments, a wearable device disclosed herein may use an actuator that includes a shape memory alloy (e.g., Nitinol) that contracts or expands on heating or cooling). In some embodiments, a wearable device disclosed herein may include a hydraulically-amplified, self-healing, electrostatic actuator for example as disclosed in U.S. Pat. No. 10,995,779.

Figure 5:
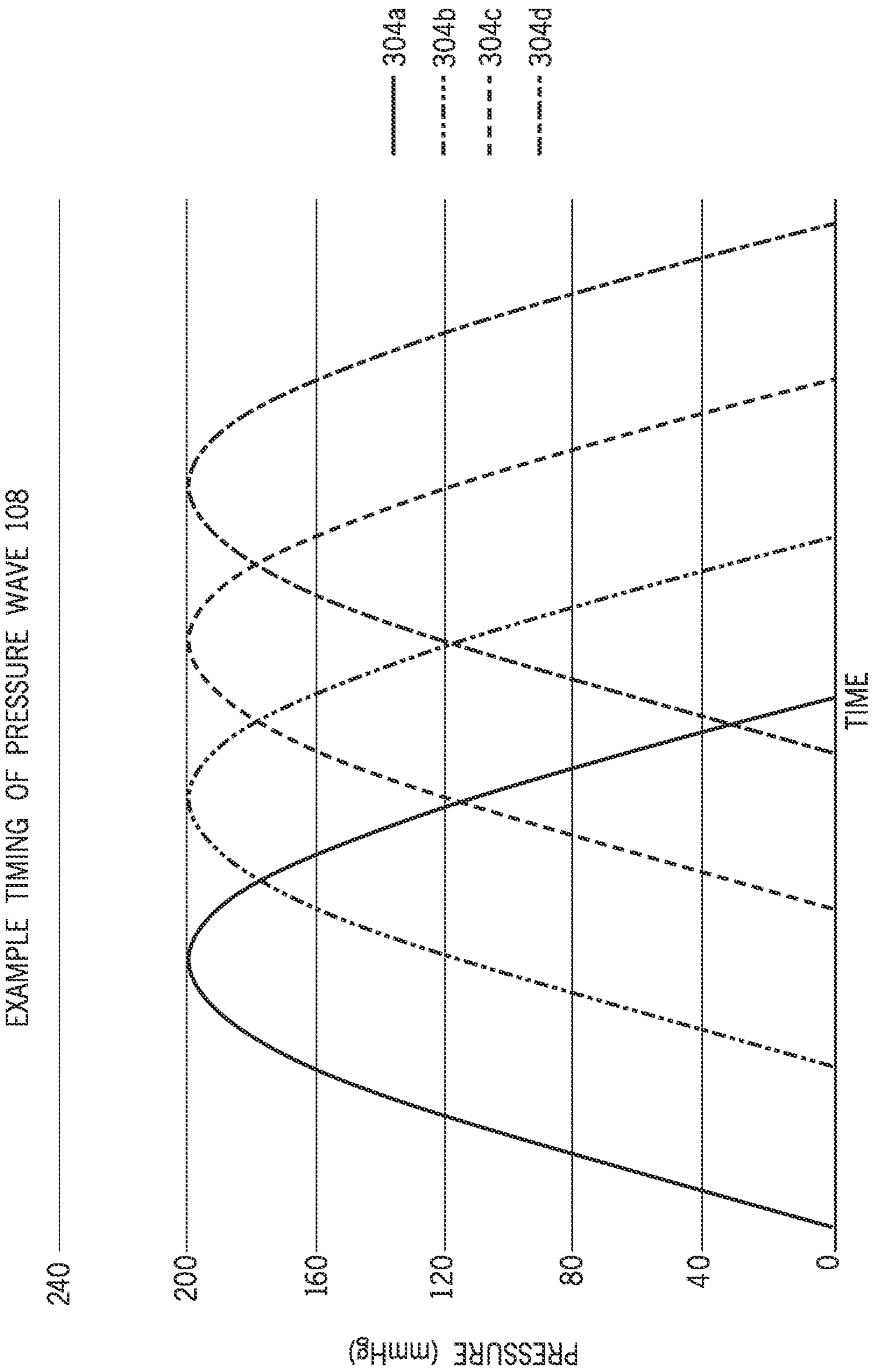
FIG. 5 is an example of a timing diagram of a pressure wave induced by a wearable device of the present disclosure.

FIG. 5 shows an example of a timing diagram for an example wearable device of the present disclosure, such as the devices 100, 300, or 400. As shown in FIG. 5, any of the wearable devices disclosed herein may apply a force to the limb of a user in the range of about 0 mmHg to about 200 mmHg. In some embodiments, a wearable device disclosed herein may apply a force to a limb of a user in the range of about 0 mmHg to about 30 mmHg. The frequency of contractions may be about 20 to 60 contractions per minute. In some embodiments, the pressure induced in the limb for four cams 304*a*-304*d* is shown in FIG. 5. As can be seen in FIG. 5, the successive peaks and troughs of the pressure from the cams causes the peristaltic movement of the pressure wave 108 along the limb of a user thereby moving fluid (lymph, blood, etc.) in a desired direction (e.g., cranial/proximal or caudal/distal).

The calf (gastrocnemius) muscle assists with the pumping action during walking, thereby facilitating venous return, but individuals in career fields that involve prolonged standing or sitting (e.g., doctors, factory workers, office workers, etc.) are at increased risk of a condition known as venous insufficiency, in which the peripheral vascular system becomes overwhelmed by stagnant blood due to inactivation of the calf pump and inability of the passive venous system to return blood to the body's core. The wearable devices disclosed herein may be suitable to treat or prevent venous insufficiency, painful and potentially deadly thrombus, blot clots, lymphatic congestion, lymphedema, and/or edema. For example, the wearable devices, at least in applications for the leg, lower leg and/or calf area of the leg, can help to facilitate the return of blood and other bodily fluids (e.g., lymph or interstitial fluid) by applying sequential external forces that propel fluid from the lower leg back to the heart (FIGS. 1 and 2A/B). The devices and apparatuses are configured to be used on any subject in any environment or occupational scenario where there is a need for the prevention and/or treatment of lower extremity varicose veins, thrombus, and edema, or where a massage device would prove effective. Standing on your feet or sitting for long periods of time can cause thrombus formation, lymphedema, and venous insufficiency as a result of chronic pooling of blood and/or lymph at the feet. Venous insufficiency, in turn, can lead to spider veins and, ultimately, unsightly varicose veins in the lower legs. The current practice of wearing compression socks has limited utility and effectiveness. Surgeons, physicians, nurses, technicians, and others who spend long periods of time standing are at risk of varicose veins or other serious health conditions that may arise like thrombus development or lymphedema. Additionally, spending hours at a time sitting at a desk, which is routine for many working professionals and students, can increase risk of developing venous insufficiency, thrombus or lymphedema. The devices of the present disclosure also move other bodily fluids such as interstitial and lymph fluid toward the center of the body and prevent pooling or clotting.

In applications such as, but not limited to, space exploration, the devices of the present application may treat or prevent orthostatic intolerance by mitigating the risk of postural hypotension (low blood pressure) upon transitioning between two environments with different gravitational forces. For example, following space travel in the weightless environment, hemodynamic changes that often arise during/after landing on another planetary surface can lead to refractory postural hypotension, or orthostatic intolerance. The wearable devices described herein may serve to address these and other, related needs. Further, the wearable devices described herein have pertinent applications in the inflight phase of space travel, during which the body is exposed to microgravity (weightlessness). Hemodynamic changes related to the cephalad fluid shifts observed in this setting may be controlled/mitigated by application of the present wearable device, but with reversal of the peristaltic pumping direction, such that dynamic pressure is applied in the caudal/distal direction. Conditions such as spaceflight-associated neuro-ocular syndrome (SANS) and other, similar physiologic effects of exposure to the spaceflight environment may be controlled and/or mitigated with the application of an embodiment of any wearable device disclosed herein.

Unlike existing products, e.g., compression socks/sleeves, presently disclosed apparatuses and devices do not stretch over time and wear out, and therefore provide a long-term solution. Unlike bulky sequential compression devices used in hospital settings, which are large, noisy (typically pneumatic) machines that prevent users from being ambulatory while using the sequential compression device, the wearable devices of the present disclosure can be worn by users in their normal activities (e.g., walking, sitting, running, standing, etc.) Existing devices, like sequential compression devices, do not induce peristaltic waves but rather bulk-compress a large portion or all of a limb and then release it. Furthermore, such existing devices do not circumferentially surround a limb and move fluid in a desired direction as with devices of the present disclosure.

Applications and Uses

Provided herein are wearable apparatuses and/or devices for treating venous insufficiency in a variety of settings and applications, and/or for providing massage therapy. The devices and apparatuses are configured to be used on any subject in any environment or occupational scenario where there is a need for the prevention and/or treatment of lower extremity varicose veins and edema, or where a massage device would prove effective. Standing on your feet for long periods of time can cause venous insufficiency as a result of chronic pooling of blood at the feet. This, in turn, can lead to spider veins and, ultimately, unsightly varicose veins in the lower legs. The current practice of wearing compression socks has limited utility and effectiveness.

By way of example and not limitation, professionals in the medical field are in need of such devices and apparatuses, particularly during a pandemic where long hours are required. Surgeons, physicians, nurses, technicians, and others who spend long periods of time standing are at risk of varicose veins.

Additionally, spending hours at a time sitting at a desk, which is routine for many working professionals and students, can increase risk of developing venous insufficiency. Likewise for truck drivers, transport pilots, and others who spend a lot of time sitting.

As another example, the disclosed devices and apparatuses can be configured for applications for bedridden/post-operative/Intensive Care Unit (ICU) patients, where venous return and blood clot prevention are critical.

As another example, the disclosed devices and apparatuses can be configured for use by high-performance jet pilots. The device can be configured with a specific contraction pattern that can replace the current pneumatic G-suit and help to prevent G-induced loss of consciousness on maneuvering.

As another example, the disclosed devices and apparatuses can be configured for applications in space flight and use by astronauts. Astronauts often suffer from the exact opposite problem from that described above: venous return is highly effective in microgravity, and both blood and extravascular fluid tend to stagnate in the head, neck, and upper torso, causing a litany of problems affecting vision, olfaction, and overall cardiopulmonary function. Such an application can help decrease the fluid shifts seen following adaptation to the spaceflight environment. More particularly, a modified version of the disclosed device and apparatus can be configured to pump in the opposite direction, toward the feet, to reduce headward fluid shifts and associated harmful physiologic processes by reversing pump direction and decreasing venous return during space flight.

As a final non-limiting example the disclosed devices and apparatuses can be used by athletes to reduce workout recovery time and maximize training value by enhancing post-workout blood flow, including by providing massage therapy.

Taken together, in some embodiments, peristaltic movement can be cranial/proximal for some applications (e.g., terrestrial/venous/lymphatic), and caudal/distal for other applications (e.g., spaceflight use). In some embodiments, the disclosed devices can be configured such that a user or practitioner can select between cranial/proximal and caudal/distal peristaltic movement.

In addition to treating venous insufficiency, some embodiments of the disclosed devices and apparatuses can be configured to fit the upper extremity and may provide a tremendously effective mechanism for reducing lymphedema associated arm swelling after surgical treatments for conditions such as breast cancer: by propelling lymph flow back toward the torso, lymphatic congestion can be eliminated.

These and other applications, as would be appreciated by one of ordinary skill in the art, are provided, particularly where there is a need to treat and/or prevent venous insufficiency, lymphedema release, blood clot relief, extravascular fluids, i.e. lymph and the like.

Advantages of the Presently Disclosed Apparatuses and Devices

The presently disclosed apparatuses and devices make up for absent gastrocnemius contraction by applying pressure in peristaltic waves to keep blood from pooling in extremities and appendages, including for example the lower legs. Unlike existing products, e.g., compression socks/sleeves, presently disclosed apparatuses and devices do not stretch over time and wear out, and therefor provide a long-term solution. Additionally, the presently disclosed apparatuses and devices are easy to use, hassle-free, and consumer friendly, even in strict environments such as medical facilities, operating rooms, etc. Moreover, the presently disclosed apparatuses and devices can in some embodiments be reasonably quiet and/or inaudible such that during use the devices do not cause a distraction or otherwise interfere with the user and others around the user.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. An apparatus for treating or preventing venous insufficiency, thrombus development, or lymphedema comprising:

a sleeve wearable on a limb of a user;

an upper bracket and a lower bracket releasably coupling the sleeve to the limb;

an actuator coupled to one of the upper or lower brackets;

a shaft coupled to the actuator and the other of the upper or lower brackets;

at least three cams fixedly coupled to, and longitudinally spaced along, the shaft, each cam having a nose with a nose height measured from the shaft, a first nose height of a first cam being greater than a second nose height of a second cam, the nose of adjacent cams having different angular positions with respect to the shaft; and a respective plurality of flexible elements, each coupled to one of the cams and to the sleeve, wherein rotational motion of the actuator about an axis of rotation causes the plurality of cams, via the respective plurality of flexible elements, to induce a peristaltic first pressure wave in the limb.

2. The apparatus of claim 1, wherein each of the plurality of cams is angularly indexed with respect to at least one other of the plurality of cams about the axis of rotation.

3. The apparatus of claim 1, wherein the first cam is adjacent to the second cam along a longitudinal dimension of the shaft.

4. The apparatus of claim 1, wherein a direction of rotation of the actuator is reversible.

5. The apparatus of claim 1, wherein a rotation of the actuator in a first direction induces the first pressure wave in a cranial/proximal direction in the limb.

6. The apparatus of claim 5, wherein a rotation of the actuator in a second direction opposite the first direction induces the first pressure wave in a caudal/distal direction in the limb.

7. The apparatus of claim 1, wherein the sleeve is conformable on the limb.

8. The apparatus of claim 1, wherein the first pressure wave has a magnitude of between about 30 mmHg and 200 mmHg.

9. The apparatus of claim 1, wherein the first pressure wave has a frequency of about 20 to 60 waves per minute.

10. The apparatus of claim 1, wherein the nose height and angular position of at least two cams induces a second pressure wave in the limb at the same time and different location as the first pressure wave.

11. The apparatus of claim 1, further comprising a power source that powers the actuator.

12. The apparatus of claim 11, wherein the user is a human and the apparatus further treats of prevents lower extremity varicose veins, blood clot formation, orthostatic intolerance, for edema.

13. A method of treating or preventing venous deficiency insufficiency, thrombus development, or lymphedema comprising:

applying a wearable device to a limb of a user, wherein the wearable device comprises:

a sleeve wearable on a limb of the user;

an upper bracket and a lower bracket releasably couplable to the limb; an actuator coupled to one of the upper or lower brackets;

a shaft coupled to the actuator and the other of the upper or lower brackets;

at least three cams fixedly coupled to, and longitudinally spaced along, the shaft, each cam having a nose with a nose height measured from the shaft, a first nose height of a first cam being greater than a second nose height of a second cam, the nose of adjacent cams having different angular positions with respect to the shaft; and a respective plurality of flexible elements each coupled to one of the plurality of cams and to the sleeve, wherein rotational motion of the actuator about an axis of rotation causes the plurality of cams, via the respective plurality of flexible elements, to induce a peristaltic first pressure wave in the limb.

14. The method of claim 13, wherein the first pressure wave has a magnitude of between about 30 mmHg and 200 mmHg.

15. The apparatus of claim 1, wherein the apparatus is adapted for use in an inflight phase of space travel to mitigate hemodynamic changes related to fluid shifts caused by exposure to an altered gravity environment.

* * * * *